(12) United States Patent
Dutson

(10) Patent No.: US 7,951,041 B2
(45) Date of Patent: May 31, 2011

(54) VARIATOR

(75) Inventor: Brian Joseph Dutson, Manchester (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 847 days.

(21) Appl. No.: 11/628,921

(22) PCT Filed: Jun. 7, 2005

(86) PCT No.: PCT/GB2005/002235
§ 371 (c)(1),
(2), (4) Date: Dec. 3, 2007

(87) PCT Pub. No.: WO2005/121602
PCT Pub. Date: Dec. 22, 2005

(65) Prior Publication Data
US 2008/0254933 A1   Oct. 16, 2008

(30) Foreign Application Priority Data
Jun. 7, 2004   (GB) .................................. 0412615.7

(51) Int. Cl.
*F16H 15/38*   (2006.01)
(52) U.S. Cl. ............................... 476/40; 476/44; 476/46
(58) Field of Classification Search .................... 476/40, 476/42, 44, 46
See application file for complete search history.

(56) References Cited

U.S. PATENT DOCUMENTS

| | | | |
|---|---|---|---|
| 1,981,910 A | 12/1929 | Ehrlich | |
| 2,079,683 A | 5/1937 | Chilton | |
| 2,124,398 A | 7/1938 | Hayes | |
| 3,394,617 A | 7/1968 | Dickenbrock | |
| 3,440,895 A | 4/1969 | Fellows | |
| 5,895,337 A | 4/1999 | Fellows et al. | |
| 6,071,209 A | 6/2000 | Greenwood | |
| 2002/0128114 A1 | 9/2002 | Ervin | |
| 2003/0083175 A1 | 5/2003 | Haka et al. | |

FOREIGN PATENT DOCUMENTS

| | | |
|---|---|---|
| DE | 102 23 425 A1 | 12/2003 |
| EP | 0444086 B1 | 1/1993 |

(Continued)

OTHER PUBLICATIONS

GB Search Report for GB0412615.7, dated Oct. 13, 2004, 2 pages.

(Continued)

*Primary Examiner* — William C Joyce
(74) *Attorney, Agent, or Firm* — Blakely, Sokoloff, Taylor & Zafman LLP.

(57) ABSTRACT

A continuously variable ratio device ("variator") is disclosed in which a pair of rotary races (252, 254) is mounted for rotation about a common variator axis (218). Drive is transferred from one race to the other through at least one roller (200) running upon them. The drive ratio is variable by virtue of precession of the roller about a precession axis (228). Precession results in a change in angle between the roller axis and the variator axis and a corresponding change in drive ratio. In accordance with the invention, the roller (200) is coupled to a carrier (214) in a manner which permits it to precess relative to the carrier (214). The carrier itself is rotatable about a carrier axis (226) which is non-parallel to the precession axis. Rotation of the carrier (214) about the carrier axis serves to change the orientation of the precession axis (228) and is accompanied by a change in variator drive ratio.

18 Claims, 14 Drawing Sheets

FOREIGN PATENT DOCUMENTS

| | | |
|---|---|---|
| EP | 0930449 A2 | 7/1999 |
| GB | 258624 | 4/1927 |
| GB | 380485 | 9/1932 |
| GB | 389857 | 3/1933 |
| GB | 392589 | 5/1933 |
| GB | 464764 | 4/1937 |
| GB | 665237 | 1/1952 |
| GB | 1002479 A | 8/1965 |
| GB | 2227287 A | 7/1990 |
| WO | WO 03/062670 A1 | 7/2003 |
| WO | WO 03/062675 | 7/2003 |

OTHER PUBLICATIONS

PCT International Search Report and Written Opinion for PCT/GB2005/002235, mailed Aug. 25, 2005, 9 pages.

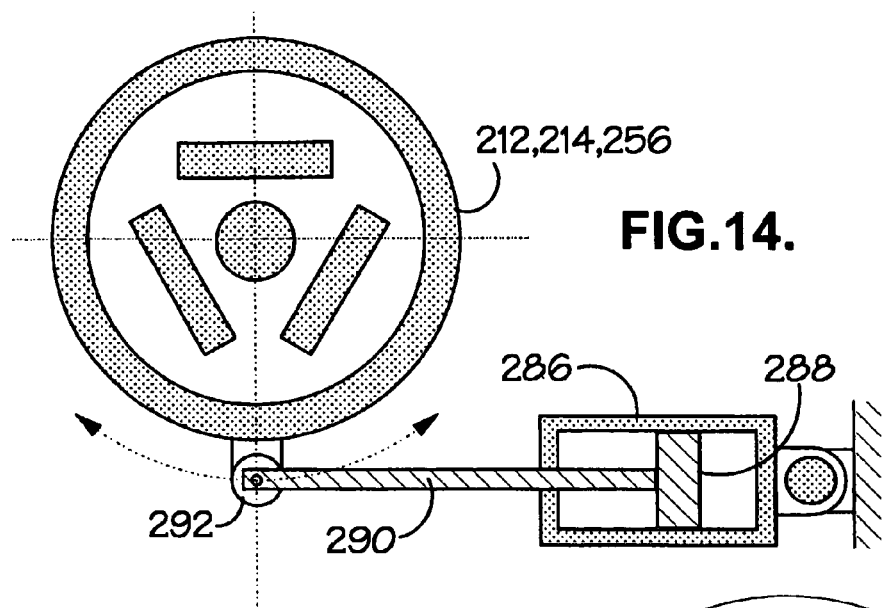
FIG. 14.
FIG. 15.
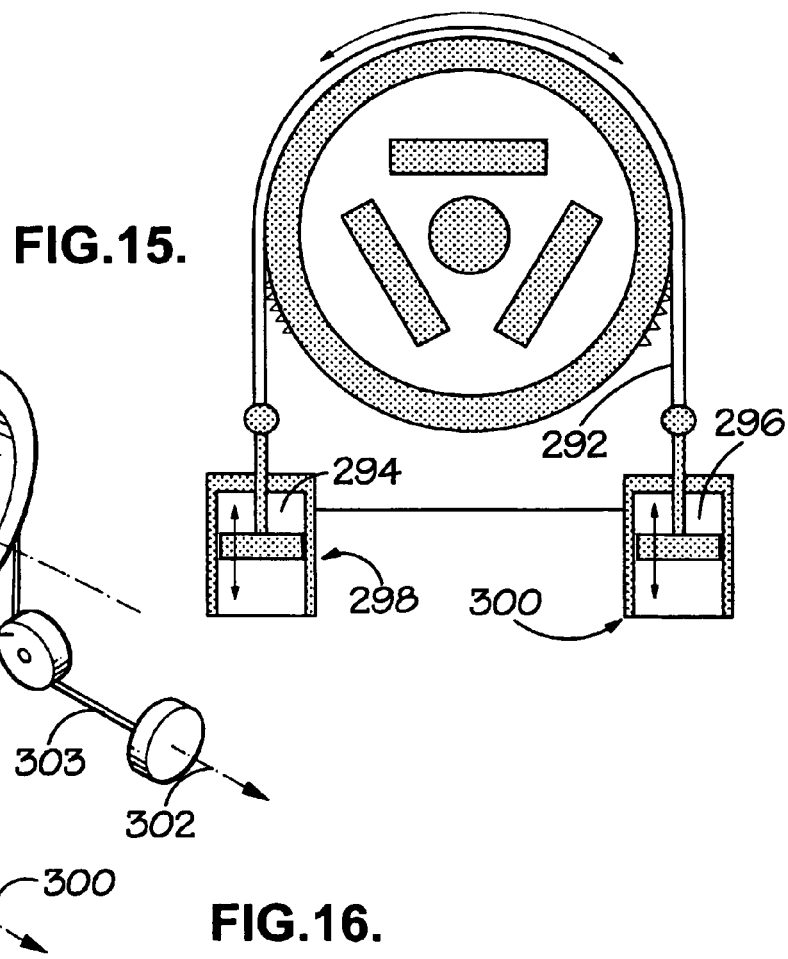
FIG. 16.

VARIATOR

CROSS-REFERENCE TO RELATED APPLICATIONS

This is a National Phase of International Application No. PCT/GB2005/002235, filed on Jun. 7, 2005, which claims priority from Great Britain Patent Application No. 0412615.7, filed on Jun. 7, 2004.

BACKGROUND OF THE INVENTION

The present invention relates to rolling-traction variators of the type in which drive is transmitted from one race to another by one or more rollers whose orientation is variable in accordance with changes in variator drive ratio. More particularly, the invention concerns a novel mechanism for control of roller orientation.

The word "variator" as used herein refers to a transmission device which provides a continuously variable ratio. FIG. 1 illustrates, purely by way of example rather than limitation and in highly simplified form, some of the principal components of a known rolling-traction type variator 10 in which drive is transmitted from outer discoidal races 12, 14 to an inner discoidal race 16 (or vice versa) through rollers 18 running upon the races. Only two rollers are shown but a practical variator typically has six such rollers in total, with three in both of the cavities 38 defined between the races. Traction between the rollers and races is provided by biasing them toward each other, which is achieved in this example by means of a hydraulic actuator 20 urging one race 14 toward the others. In the illustrated example the left hand outer race 14 is keyed to a variator shaft 22 to rotate along with it, while the right hand outer race 12 is in this illustration integrally formed with the shaft. Inner race 16 is journalled for rotation about the shaft, which may be driven from an engine schematically represented at 23. Rotation of the outer races 12, 14 turns the rollers 18 and hence also the inner race 16. Power take-off from the inner race may be achieved by a chain running upon it, or through some co-axial arrangement, as is well known in the art.

The rollers are able to "precess". That is, each can change its orientation, varying the inclination of the axis of the roller to the "variator axis" 21 defined by the shaft 22. Two alternative orientations of the rollers 18 are respectively indicated in solid lines and in phantom in FIG. 1. It will be apparent that by moving from one orientation to another each roller changes the relative circumferences of the paths it traces out upon the inner and outer races, thereby enabling a change in the variator drive ratio.

Hence the roller's mountings must enable it both to spin about its own axis and also to turn about a different axis which will be referred to as the "precession axis". Correspondingly the turning motion which changes roller orientation will often be referred to as "precession" herein. Roller precession is not controlled directly, by applying torque to the roller mountings about the precession axis. Instead, the roller's mountings leave the roller free to precess and roller orientation is controlled by virtue of a steering effect exerted upon the rollers by the races. As an example of this, consider the known variator construction illustrated in FIGS. 2 and 3. These drawings are taken (with some modifications) from Torotrak (Development) Limited's patent GB 2227287 and for more detail on the construction and operation of this and other types of variator, reference should be made to that document. FIGS. 2 and 3 show only two of the variator's races 12, 16. Each roller 18 (only one of which is shown) is journalled in a movable carrier 30, which is coupled to a piston 32 running in a cylinder 34. The roller and its carrier are able to precess together about a precession axis 36 determined, in this particular construction, by the positioning of the cylinder 34. Note that the precession axis does not lie in a radial plane. Instead it forms a "castor angle" CA with the radial plane, as seen in FIG. 2. As the piston moves back and forth along the cylinder, the roller likewise moves back and forth. The races 12, 16 are in this example shaped to define a toroidal cavity, containing the rollers, of circular section, similar to the cavities 38 seen in FIG. 1. The races constrain the roller 18 so that as it moves back and forth its centre follows a path which is an arc of the centre circle 40 of the torus. This centre circle is the locus of the centre points of the generator circles of the torus. Movement of the roller along this path depends upon the balance between (a) the circumferential component 2F of a biasing force applied to the roller's carriage by the piston 32 and (b) the two forces F exerted upon the roller 18 by the respective races 12, 16.

The rollers each tend toward a position in which, at the "contacts" between the roller 18 and the races 12, 16 (the word "contacts" is used in a loose sense because these components do not actually touch, being separated by a thin film of traction fluid, as known in the art) the motion of the roller periphery is parallel to the motion of the surface of the race. A mismatch between roller and race movement at the contacts results in a steering moment upon the roller about the precession axis, tending to cause the roller to precess to reduce the mismatch. The condition for the two movements to be parallel (i.e. for zero steering moment) is that the axis of the roller should intersect the variator axis.

Consider what happens as the roller/carriage assembly 18, 30 is displaced to the left or right in FIG. 3. If the roller axis 41 initially intersects the variator axis 21, the roller's displacement takes it away from such intersection but only transiently, because the resulting steering moment causes the roller to precess as it is displaced. By virtue of the castor angle CA, such precession is able to restore the intersection of the two axes. The result is that the roller's "precession angle" is a function of its displacement along its circular path 40. In this known construction the relationship between roller position and precession angle depends upon the castor angle.

The arrangement offers the facility for the variator to be "torque controlled". This manner of variator operation has been explained in various published patents in the Torotrak (Development) Limited name including European Patent 444086 and is known to those skilled in the art. To briefly explain, in a torque controlled variator the variator ratio is not directly controlled. A controlled biasing force (the force 2F in FIG. 2) is applied to each of the rollers and at equilibrium this must be balanced by the forces exerted upon the roller by the variator races (the forces F in FIG. 2). The forces exerted by the races upon the rollers are determined by the torques upon the respective variator races as well as the radii of the paths traced upon the discs by the rollers. A simple analysis shows that:

$$\text{Actuator Biasing Force } \alpha \ T_{in} + T_{out}$$

where $T_{in}$ and $T_{out}$ are the torques upon the inner and outer variator discs, respectively. The sum $T_{in}+T_{out}$ is referred to as the "reaction torque" and it is this quantity, rather than variator ratio, which is directly controlled. Changes in variator ratio result from the application of $T_{in}$ and $T_{out}$ (added to externally applied torques, e.g. from a driving engine) to the inertias acting on the variator's input and output. The rollers automatically move and precess in accordance with consequent changes in variator ratio.

Another type of known variator construction is found for example in GB 1002479 and is illustrated in FIG. 4. Variator rollers are again indicated at 18, although here a full set of three rollers in one cavity is shown, and are journalled on bearings 50 in carriers 52 at opposite ends of which are spigots 54, 56 received in aligned bores in a spider structure 58. The carrier is thus able to move slightly back and forth along a direction transverse to the variator axis. Such carrier movement is controlled by a three-spoked thrust receiving member 60 coupled to each carrier by a respective ball and socket joint 62. Slight rotational motion of the member 60 about the variator axis causes the rollers and carriers to move along the aforementioned transverse direction. The aligned bores receiving the spigots 54, 56 can be offset along the axial direction to create a castor angle and the steering effect explained above is used to control roller orientation. The roller's bearings 50 allow it some lateral "float" so that it can follow the necessary circular path about the variator axis, despite the carrier 52 following a straight line.

The above embodiments involve the carrier and roller rotating together to achieve the required roller precession. A different approach to roller control is taught in Torotrak (Development) Limited's international patent application PCT/GB03/00259, published under WO 03/062670, and FIG. 5 shows the relevant arrangement. Here, the carrier 70 has twin piston heads 72, 74 at its opposite ends which run in respective cylinders 76, 78. Each variator roller, a single example of which is once more indicated at 18, can spin about its own axis by virtue of a roller bearing 80, but can also precess relative to the carriage because the bearing 80 is coupled to the carriage through a gimbal arrangement comprising a ball 82 and a spline 84, the spline defining the axis about which the roller precesses with respect to the carriage. Here the carrier itself is unable to rotate because the centre of the roller is offset from the axis of the piston heads 72, 74. Among the advantages of this arrangement is the fact that the castor angle, being defined by the positioning of the spline 84, can be freely chosen. In the earlier described variators problems e.g. of fouling with the variator discs constrain the choice of castor angle.

Nonetheless all of the above described variators have it in common that the steering effect required to control roller orientation is achieved simply by displacing the carrier back and forth along the centre circle of the toroidal cavity.

It is an object of the present invention to provide improvements in the manner of control of the roller(s) in a rolling-traction type variator.

SUMMARY OF THE INVENTION

In accordance with a first aspect of the present invention there is a continuously variable ratio device comprising first and second races mounted for rotation about a common axis ("the variator axis") and at least one roller which is coupled to a carrier for rotation about a roller axis and which runs upon both races to transmit drive between them at a variable drive ratio, the roller being able to precess about a precession axis which is non-parallel to the roller axis and thereby to change the angle between the roller axis and the variator axis to produce a corresponding change in the drive ratio, the device being characterised in that the roller is coupled to the carrier in a manner which permits it to precess relative to the carrier, the precession axis being thereby defined relative to the carrier, and in that the carrier is rotatable about a carrier axis which is non-parallel to the precession axis, so that rotation of the carrier about the carrier axis serves to change orientation of the precession axis, and is accompanied by a change in variator drive ratio.

By providing for the carrier itself to rotate about an axis different form the precession axis, while allowing the roller to precess relative to the carriage, a new mode of roller control is made possible.

The carrier axis is preferably parallel to the variator axis. It is preferred also that the carrier axis passes through the centre of the roller, so that rotation of the carrier does not cause radial displacement of the roller centre.

It is particularly preferred that the precession axis passes through the centre of the roller. Hence the roller is able to precess without its centre being displaced radially. In a typical variator construction the roller centre is constrained to follow the centre line of a torus defined between the two races and so is incapable of significant radial displacement.

The orientation of the precession axis is not fixed since this axis is defined with respect to the carrier, which is itself able to rotate. However it is preferred that the precession axis should always be inclined, by a non-zero castor angle, to a plane perpendicular to the variator axis. By virtue of the castor angle, following rotation of the carrier the roller is able to return, by its precessional motion, to a state in which the roller axis intersects the variator axis.

It is particularly preferred that the carrier should be able not only to rotate about the carrier axis but also to move back and forth along a circular path about the variator axis. Such an arrangement lends itself to torque control. Means may be provided for applying an adjustable force to bias the carrier along its path. For equilibrium this biasing force must then be balanced by the forces applied to the roller by the races, which is the basis of torque control.

A gearing arrangement is the preferred means for controlling rotation of the carrier.

If, as the carrier moved back and forth along its path about the variator axis, it were to maintain a constant inclination to a line radiating from the variator axis then no change in variator ratio would result. In a particularly preferred embodiment of the present invention, means are provided for rotationally driving the carrier such that inclination of the carrier to a line which is radial to the variator axis and passes through the roller centre varies as a function of the carrier's position along its path about the variator axis. In this way it can be arranged that displacement of the carrier along its path about the variator axis is accompanied by change in carrier inclination and consequent change in variator drive ratio.

The present invention gives the designer great scope to determine, by appropriate control of the carrier, the relationship between carrier displacement and variator drive ratio.

In an especially preferred embodiment, the device further comprises a sun and a ring, both concentric with the variator axis, the carrier being operatively coupled to both the sun and the ring which thereby control carrier rotation and position. The necessary control over the carrier is thus provided for in a simple and convenient manner. The carrier can be driven by the sun and ring in the manner of a planet in an epicyclic arrangement. Most preferably the sun and ring are both toothed gear wheels and the carrier is provided with gear teeth through which it engages with both.

In a practical variator problems can arise in avoiding "fouling" of one movable component by another, within the cavity defined by the two races. Such problems would be expected if the carrier were formed as a complete gear wheel with a full circular periphery. However the carrier need not rotate through a full 360° relative to the sun and ring and so does not require a full circular periphery. Instead, in a preferred embodiment of the present invention, the carrier comprises a gear wheel having inner and outer toothed portions lying on a common circular locus for engagement with the sun and ring respectively.

It is particularly preferred that both the sun and the ring gears should be rotatable about the variator axis. In such embodiments these components may be operatively coupled, e.g. through gearing, such that the position of one is a function of the position of the other. Preferably such an arrangement provides that rotation of one in either direction is accompanied by rotation of the other in the same direction and at a different rotational speed. It may provide a fixed speed ratio between the sun and the ring gears.

In such embodiments some arrangement is required through which the sun gear can be driven and it is necessary to provide for this in a manner which avoids fouling of other variator components—rollers, carriers, etc. In a preferred embodiment of the present invention a planet carrier is provided and carries at least one planet gear which engages with the sun and ring gears. In such an embodiment the sun, ring and planet carrier together function in the manner of an epicyclic. The sun can be driven through the ring and the planet carrier.

BRIEF DESCRIPTION OF THE DRAWINGS

Specific embodiments of the present invention will now be described, by way of example only, with reference to the accompanying drawings, in which: —

FIG. 14 is a schematic representation of yet a further variator embodying the present invention, along an axial direction;

FIG. 15 is a schematic representation of still a further variator embodying the present invention, along an axial direction;

FIG. 16 is a schematic, perspective illustration of selected parts of yet a further variator embodying the present invention;

Figure 1:
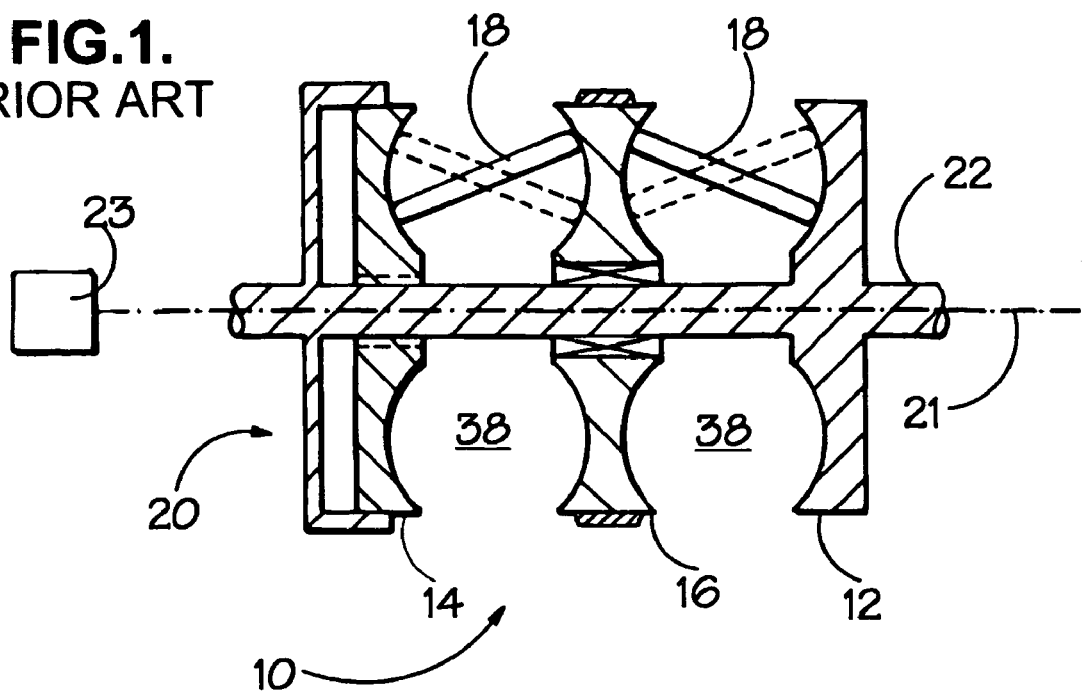
FIG. 1 is a highly simplified illustration of a known type of variator, viewed along a radial direction and partly in section.

The embodiments of the invention to be described below all involve mounting each of the variator rollers upon a respective carrier which can be caused to tilt by virtue of a drive arrangement. The principle can be understood from FIGS. 6a and 6b, in which only one of the rollers is illustrated at 200 (and is largely contained within a shroud 202 which will be described below) and the carrier is at 204. Comparing FIG. 6b with FIG. 6a, the carrier 204 has tilted about the carrier axis 226, so that the tilt angle θ is non-zero. The change in the tilt angle transiently takes the roller axis away from intersection with the variator axis and the resulting steering moment has caused the roller to precess to restore intersection. The consequent inclination of the roller corresponds to an altered drive ratio, which is no longer 1:1.

The arrangement used in this and subsequent embodiments both to mount the carrier 204 such that it can tilt around the carrier axis 226 and to drive this tilting motion of the carrier comprises an inner sun gear 212 and an annular outer ring gear 214 which are both mounted concentrically with the variator axis 218 and are rotatable thereabout. The carrier 204 is formed as a gear wheel and is arranged in the space between the sun gear 212 and ring gear 214, meshing with both. The carrier is unable to move along the variator axis because the position of the roller which it carries is dictated by the variator races. The races themselves are not shown in these drawings, but (as will be clear from subsequent drawings) lie in front of and behind the roller 200 and rotate about a common axis 218, referred to as the variator axis and lying perpendicular to the plane of the paper. The carrier is able to rotate about a carrier axis 226 which is also perpendicular to the plane of the paper. An arrangement is provided to drive the carrier to rotate about this axis and so change the carrier's "tilt angle". Let us define the tilt angle, indicated by θ in FIG. 6b, to be the angle between (1) line 216 radiating from the variator axis 218 (i.e. the axis of the variator races) and (2) some arbitrary line 220 along the carrier. The steering moments required to cause precession of the roller, and consequent variator ratio change, result from changes in tilt angle θ.

Figure 6A:
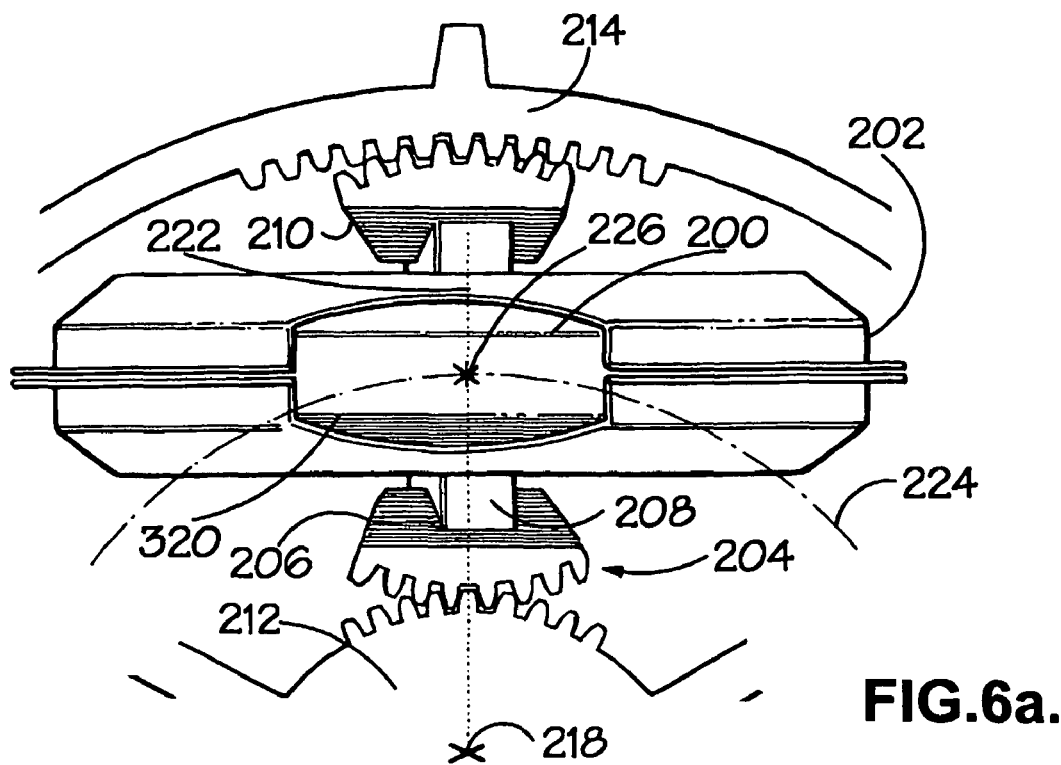
FIG. 6a is a highly schematic representation of a single roller/carrier assembly, and certain related parts, of a variator embodying the present invention, viewed along the variator axis.
Figure 6B:
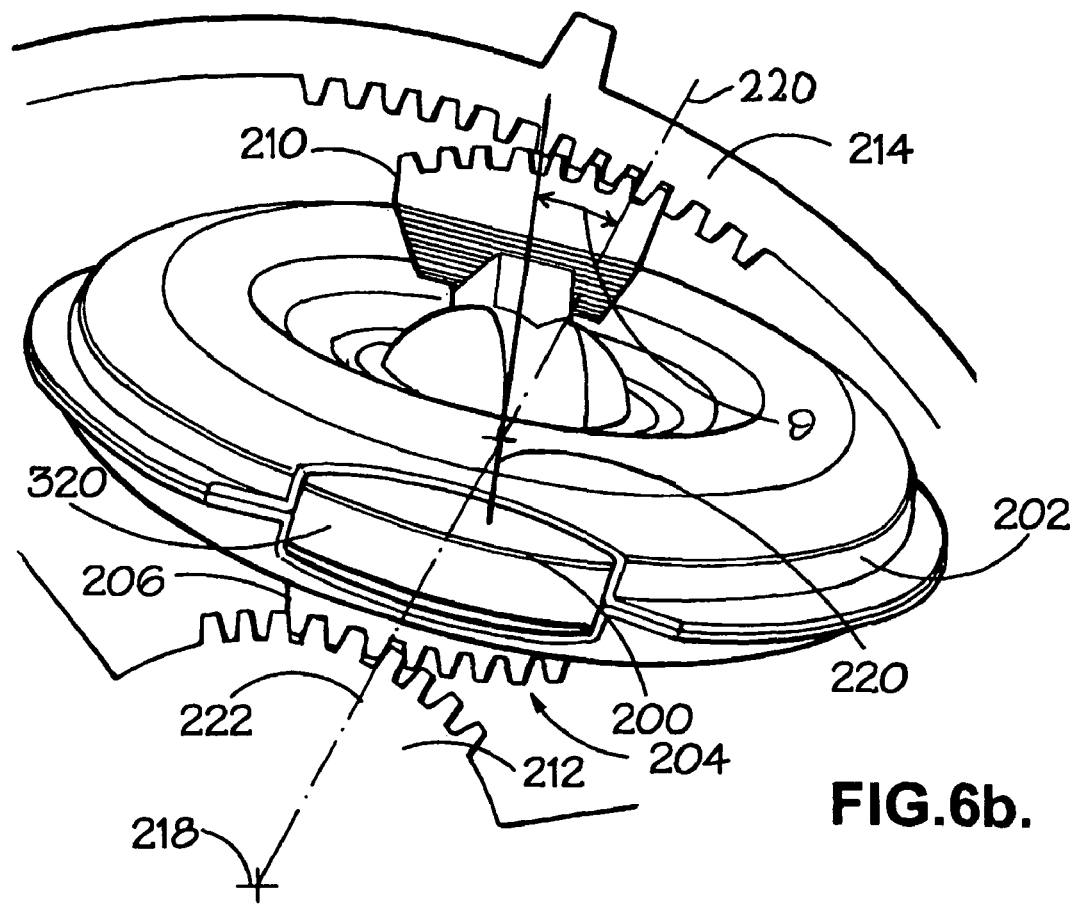
FIG. 6b shows the same assembly as FIG. 6a, but in a slightly different configuration.

In FIG. 6a the tilt angle is zero and the variator is operating at approximately 1:1 drive ratio. The roller axis 222 is perpendicular to the variator axis 218, and intersects it, as it must do at equilibrium.

Since the carrier's range of angular motion is limited its outer periphery does not need to be a complete circle. Instead the carrier has a radially inner part-circular toothed portion 206 coupled through a generally radially extending limb 208 to a radially outer part-circular toothed portion 210. This formation of the carrier 204 enables it to fit into the available space without fouling other parts such as the rollers themselves.

Consider for example what would happen if the sun and ring gears 212, 214 were to be driven to rotate at the same speed, so that they—and the carrier 204—simply turned about the variator axis while maintaining fixed positions relative to each other. The tilt angle θ would not be changed. If the roller axis 222 were initially in intersection with the variator axis 218, as it is in FIG. 6, then it would remain so and no variator ratio change would result.

However, consider what happens if the sun and ring gears are driven at different rates. In general this will again result in movement of the carrier and along a circular path about the variator axis. The roller centre follows a circle 224 which is the centre circle of the torus defined by the variator races. However at the same time the carrier 204 will rotate about the carrier axis 226 to change its tilt angle θ.

Figure 7:
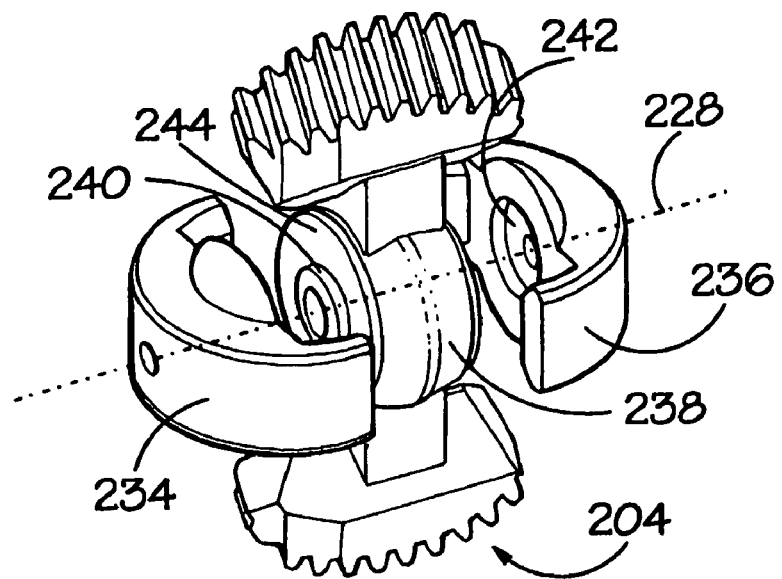
FIG. 7 is a perspective illustration of certain parts of a carrier/bearing arrangement of the same variator.
Figure 8:
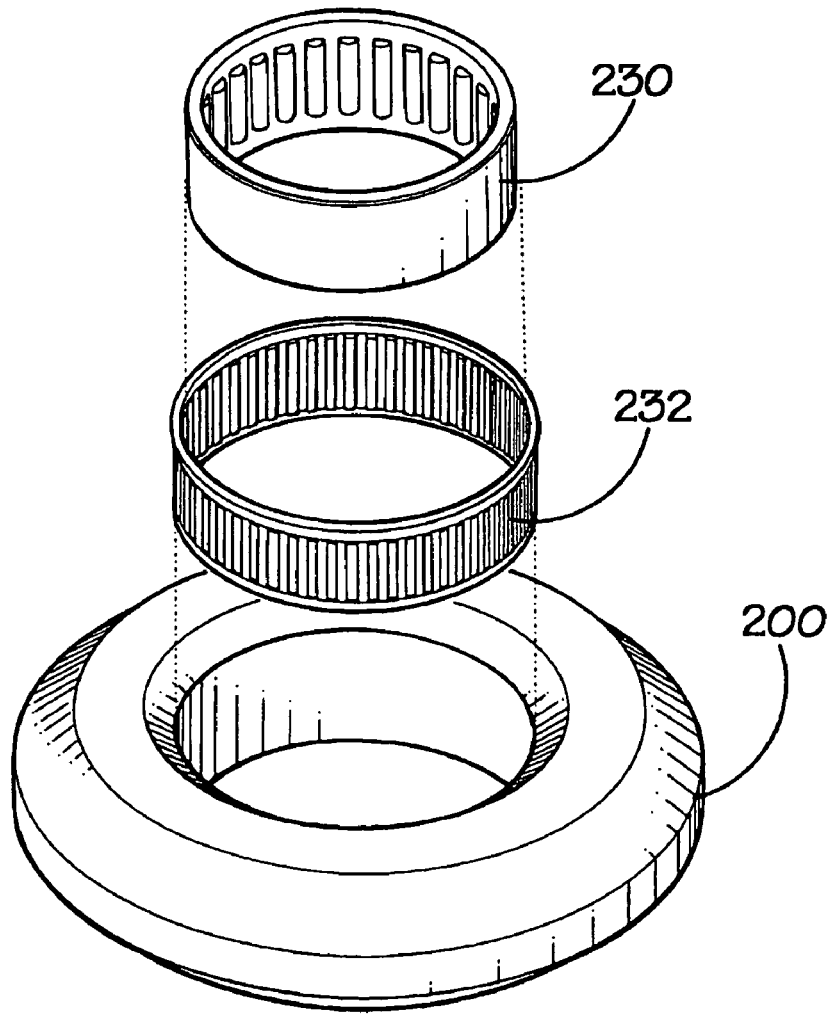
FIG. 8 is a perspective illustration of a roller and tolerance ring of the same variator.
Figure 9:
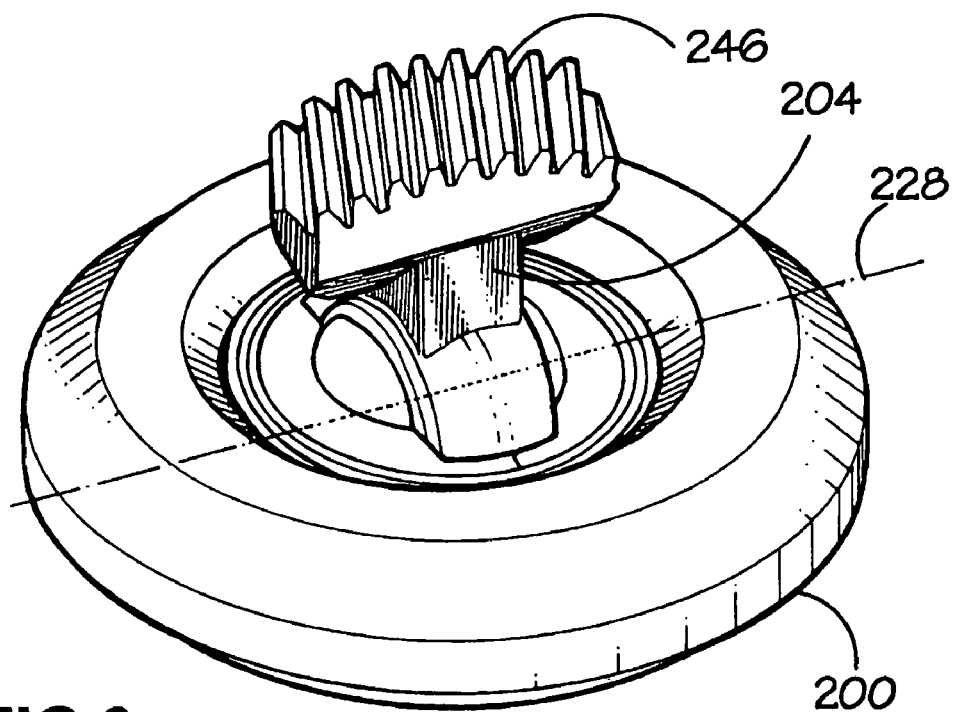
FIG. 9 is a perspective illustration of an assembly comprising the roller, carrier and bearing arrangement of FIGS. 7 and 8.

The roller has the freedom to precess relative to the carrier 204 by virtue of a bearing arrangement through which it is coupled to the carrier, and this aspect of the present embodiment will now be considered with reference to FIGS. 7 to 9. The bearing arrangement permits the roller 200 to (1) rotate about its own axis and (2) precess about a precession axis 228 which is defined—and fixed—relative to the carrier 204.

Figure 2:
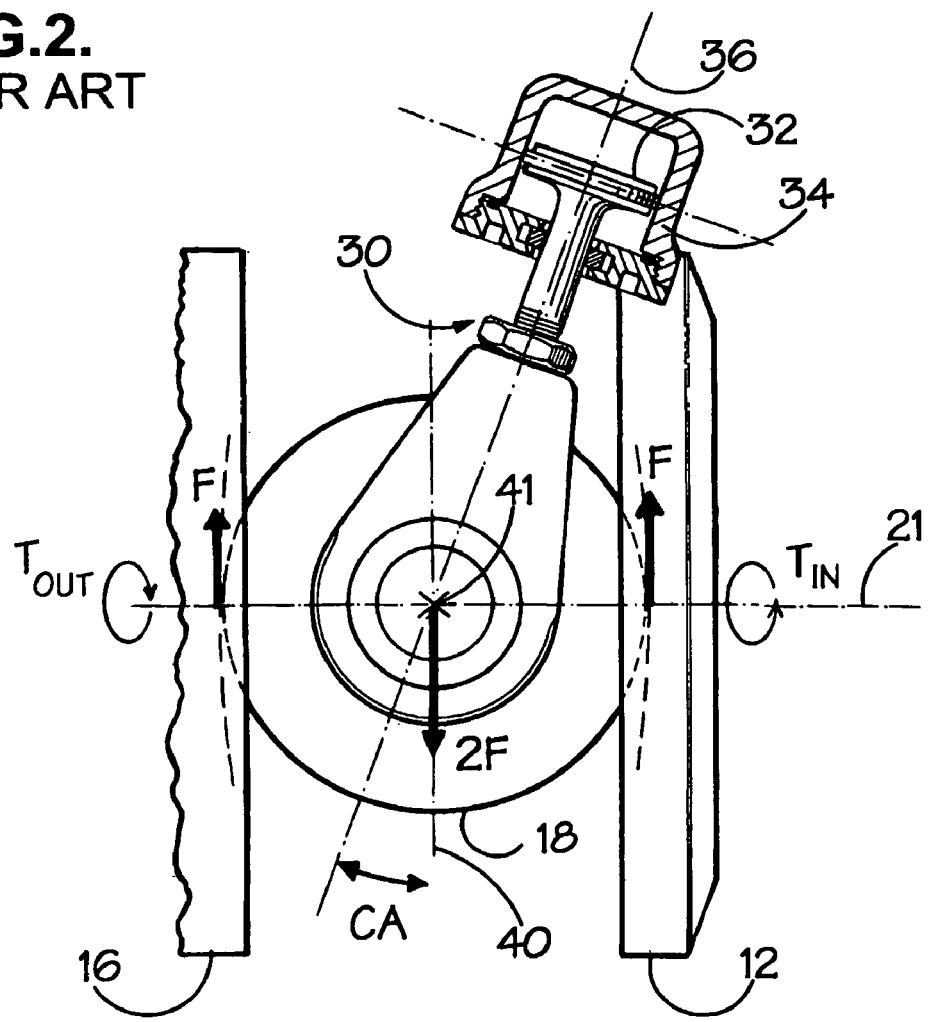
FIG. 2 illustrates part of a further known variator, viewed along a radial direction and partly in section.
Figure 3:
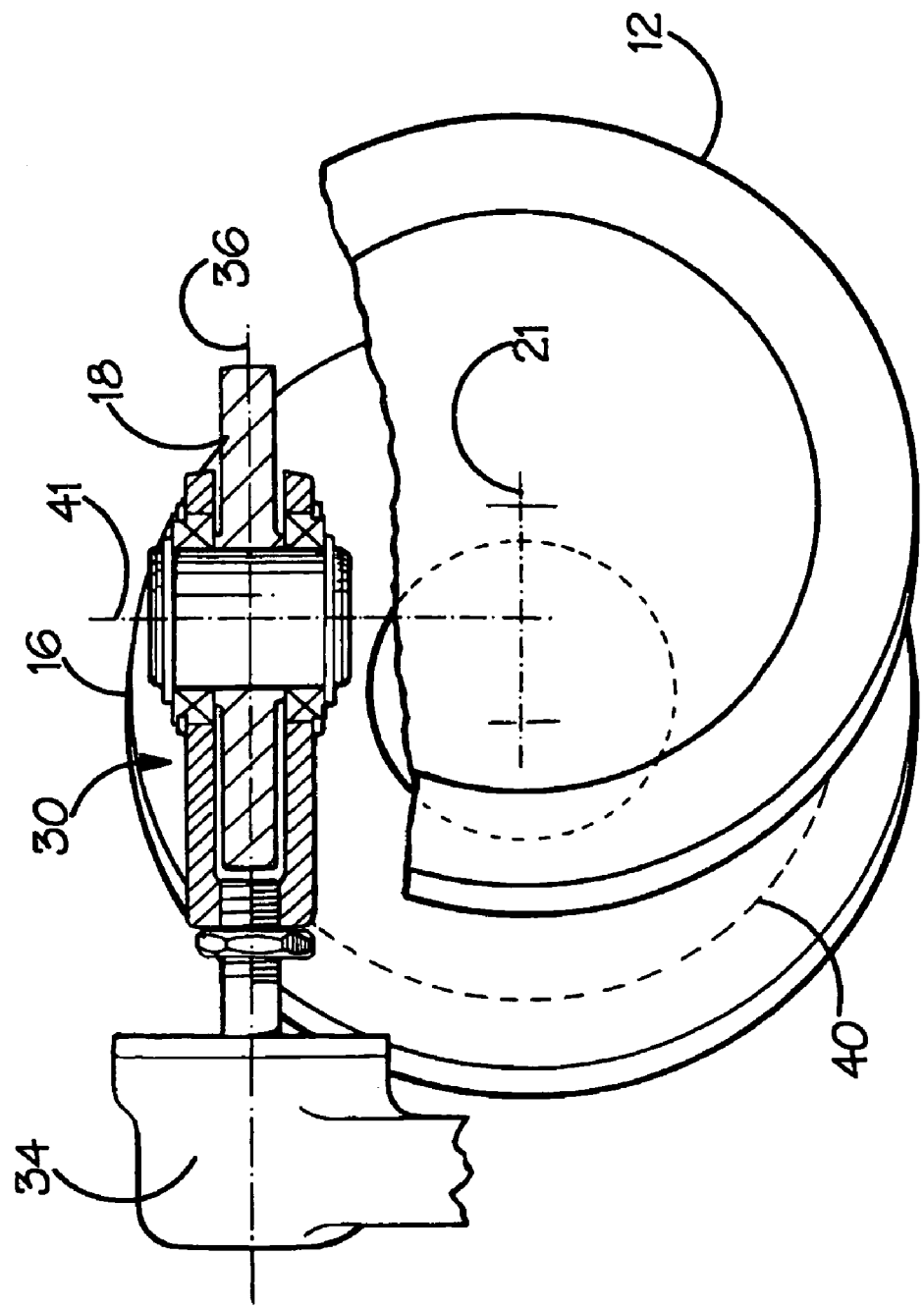
FIG. 3 is a further illustration of the parts shown in FIG. 2, viewed along a generally axial direction and with a variator race in the foreground cut away to reveal components behind it.
Figure 4:
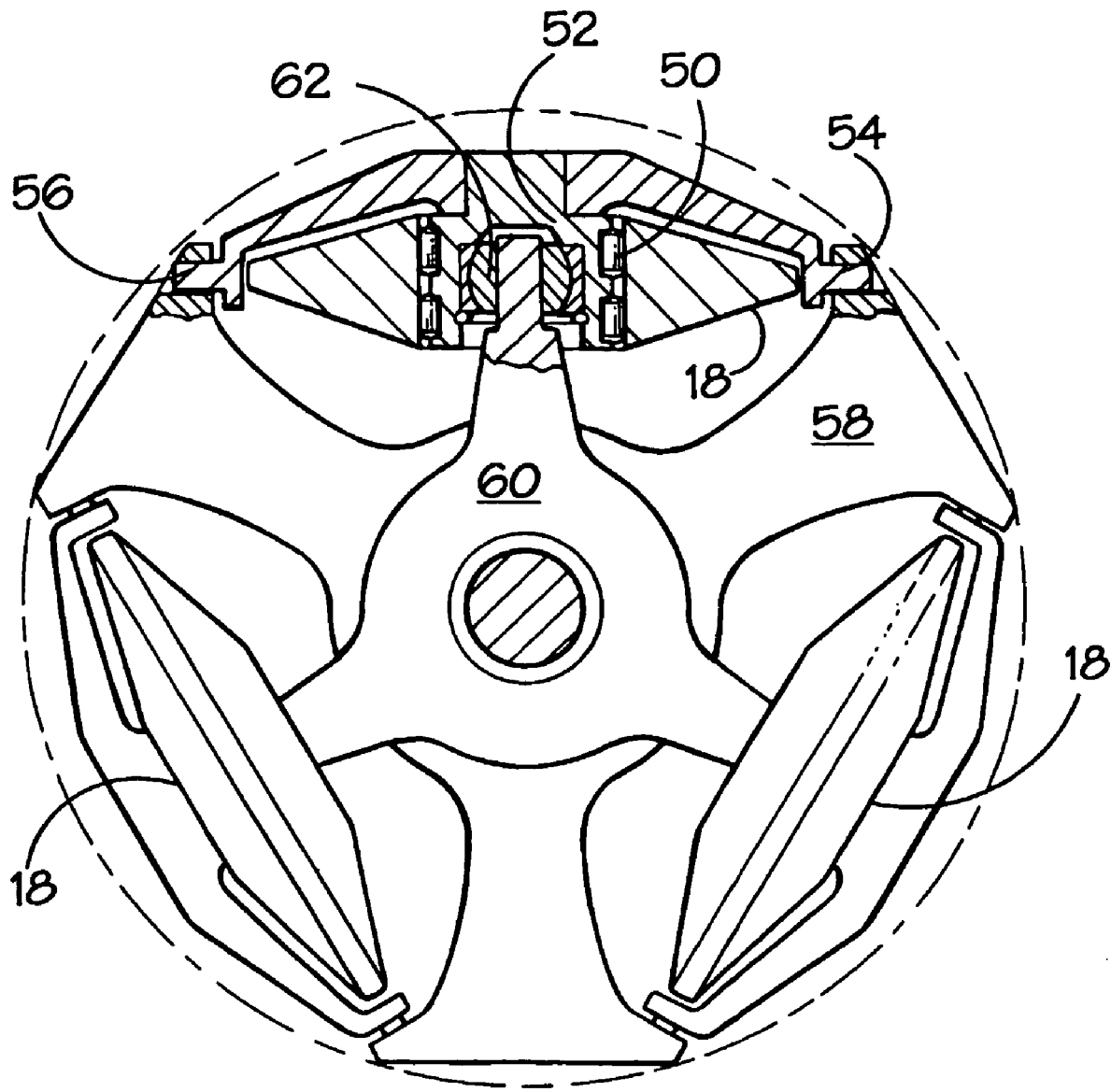
FIG. 4 illustrates parts of still a further known type of variator, viewed along the axial direction and partly in section, with a variator race which would be in the foreground wholly omitted to reveal interior components.
Figure 5:
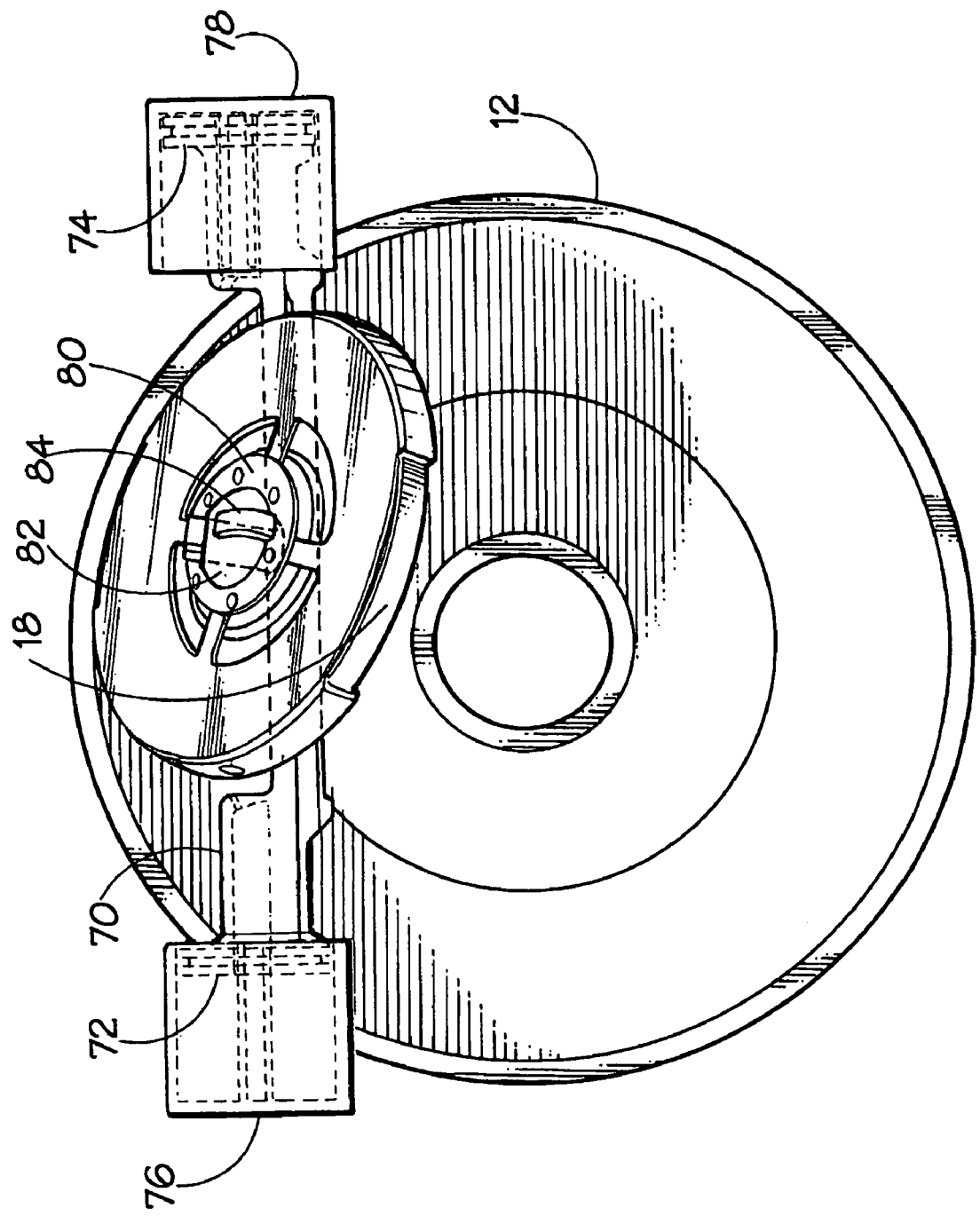
FIG. 5 illustrates parts of yet a further known type of variator, again viewed along the axial direction and with the variator race which would be in the foreground omitted to reveal interior components, the drawing showing certain internal structure in phantom.
Figure 20:
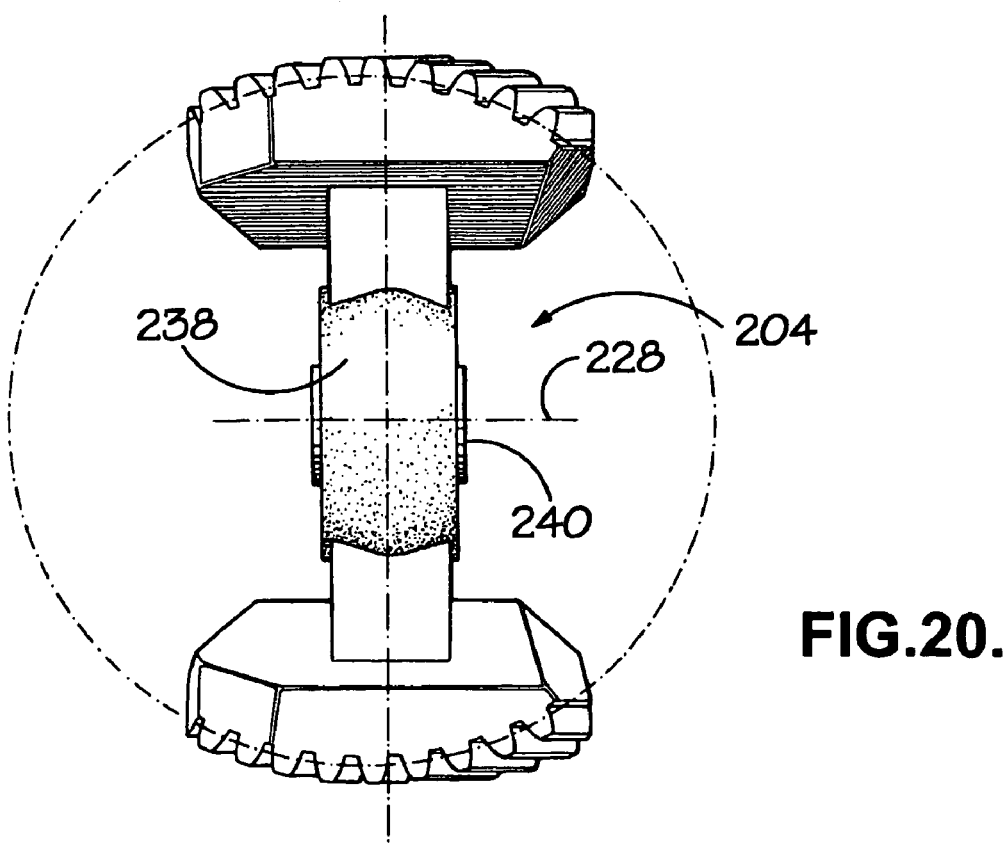
FIG. 20 is a perspective illustration of a carrier used in various embodiments of the present invention.

Rotation of the roller 200 about its own axis is provided for by means of a needle bearing 230 (FIG. 8) received in the roller's central bore. Between the roller and the bearing is provided a tolerance ring 232 (FIG. 8). By virtue of a corrugated construction, the tolerance ring provides some compliance between the roller and the bearing. In use the roller is subject by the variator races to a large compressive force along the roller's diameter. The roller is resiliently deformed somewhat as a result. The tolerance ring resiliently deforms to accommodate the roller deformation and so ensures that the compressive force is borne principally by the roller itself, rather than being passed on to the bearing 230. The inner race of the needle bearing 230 is formed in two parts 234, 236 assembled around a hub 238 of the carrier 204 (FIG. 7). The two parts 234, 236 may for example be welded together followed by machining of their outer circumference to provide the regular circular surface required of the inner bearing race. Alternatively they could be secured together by a band around their circumference (not shown) which would serve as the bearing surface. Circular spigots 240 project from either side of the hub 238 and are concentric with and aligned along the precession axis 228. The spigots are received in complementary circular recesses 242 in inner faces of the respective inner race parts 234, 236 and washers 244 separate the inner faces 241 from the adjacent faces of the hub 238. The construction permits the inner bearing race 234, 236, and hence the roller 200 carried upon it, to precess relative to the carrier 204 about precession axis 228 as mentioned above. It is important to note that the precession axis does not lie in a plane which is radial (perpendicular) to the variator axis (such as the plane of the paper in FIG. 6). Instead the precession axis 228 is inclined to such a plane to form the castor angle. The point can be best understood from FIG. 20, which shows the carrier 204 along a direction perpendicular to the precession axis 228. The carrier's gear teeth are seen to be inclined to the precession axis rather than perpendicular to it. The angle of the gear teeth determines, in the present embodiment, the castor angle between the precession axis and the radial plane. One of the benefits of this arrangement, as compared with the type of prior art arrangement illustrated in FIG. 2, is that the castor angle is not limited by the variator construction. In the FIG. 2 variator the maximum possible castor angle is limited by fouling of the actuator by the variator races. By contrast the type of construction considered here gives the designer increased freedom to choose the castor angle as necessary to meet requirements for speed of variator response and stability against oscillation.

Figure 10:
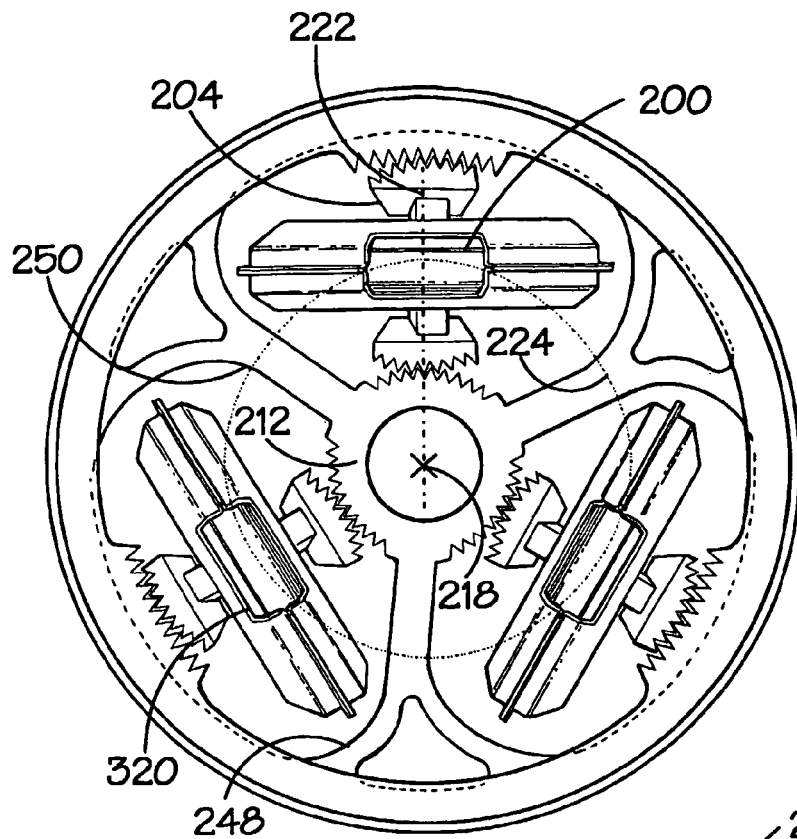
FIGS. 10 and 11 are views of a further variator embodying the present invention along an axial direction with a variator race which would be in the foreground being omitted to reveal certain interior components.
Figure 11:
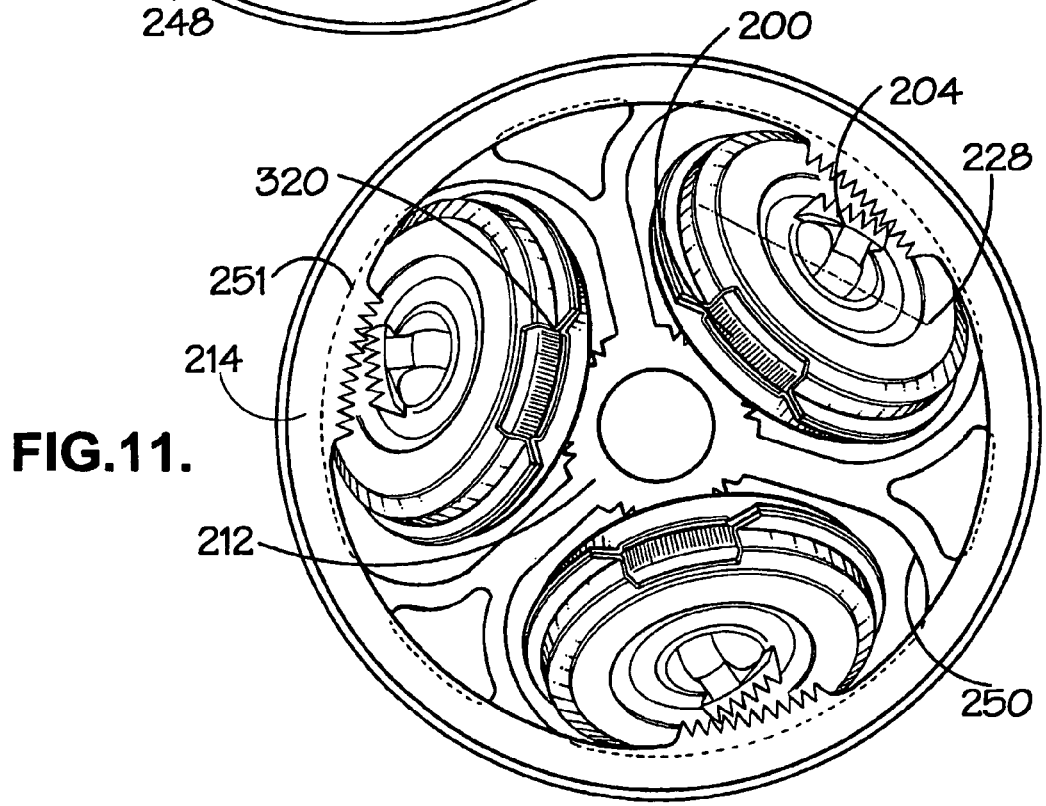

FIGS. 10 and 11 are intended to make the motion of the carriers 204 and rollers 200 clear. These drawings show a practical arrangement with three rollers arranged at regular angular intervals within a toroidal cavity formed between a pair of toroidal variator races. Details of the races are not shown in these drawings but they can be similarly formed to the races 12, 14, 16 seen in FIG. 1. The circular path which the centres of the rollers follow about the variator axis as the carriers move back and forth is once more indicated at 224 in FIG. 10. This is in fact the centre line of the toroidal cavity defined by the races. In this embodiment a spoked spider structure 248 is used to drive the sun gear 212, as will be explained below.

In FIG. 10 the variator is operating at approximately 1:1 ratio. The axes of the rollers are approximately perpendicular to the variator axis (the angle in question would be measured in a plane containing the variator axis—i.e. perpendicular to the paper—and so cannot be indicated in this view). Each roller axis 222 intersects the variator axis 218, as they must at equilibrium. The common tilt angle θ of each carrier 204 is defined to be zero in this condition.

Comparing FIG. 11 with FIG. 10, the sun gear 212 and the ring gear 214 have both been advanced along a clockwise direction, with the sun gear moving further than the ring gear. Several changes have consequently taken place:
i) because the sun and ring gears have both rotated in the same direction (clockwise), the carriers 204 and rollers 200 have also advanced clockwise, the centre of each roller 200 moving along the circle 224;
ii) because the sun gear 212 has rotated faster than the ring gear 214, each carrier 204 has been caused to tilt—i.e. to rotate about its carrier axis 226, changing its tilt angle θ;
iii) the change in carrier tilt angle has caused an angular shift of the roller axes, transiently taking them away from intersection with the variator axis. A steering effect has thus been exerted upon the rollers as previously described, causing them to precess (about precession axes 228 defined with respect to the carriers 204) to the illustrated positions, thereby restoring intersection. It will be apparent that the roller axes are no longer perpendicular to the variator axis but inclined to it. Correspondingly the variator's drive ratio has been altered and in fact the variator is shown close to one extreme of the available ratio range.

It should be apparent therefore that through the sun and ring gears 212, 214 control can be exercised over the variator. Driving the sun gear 212 presents a challenge because of the gear's position within the variator cavity. Two different solutions have so far been devised. The first of these solutions is seen in FIGS. 10 and 11, in which the spider structure 248 comprises shaped radial limbs 250 which pass through the cavity and couple the sun gear 212 to a wheel outside the cavity to which drive can be applied. The wheel itself is not in the foreground in these drawings and its perimeter is indicated in phantom at 251. The radial limbs 250 must be formed in a manner which avoids fouling of the rollers and carriages as they move, which is the reason for their shape.

Figure 12:
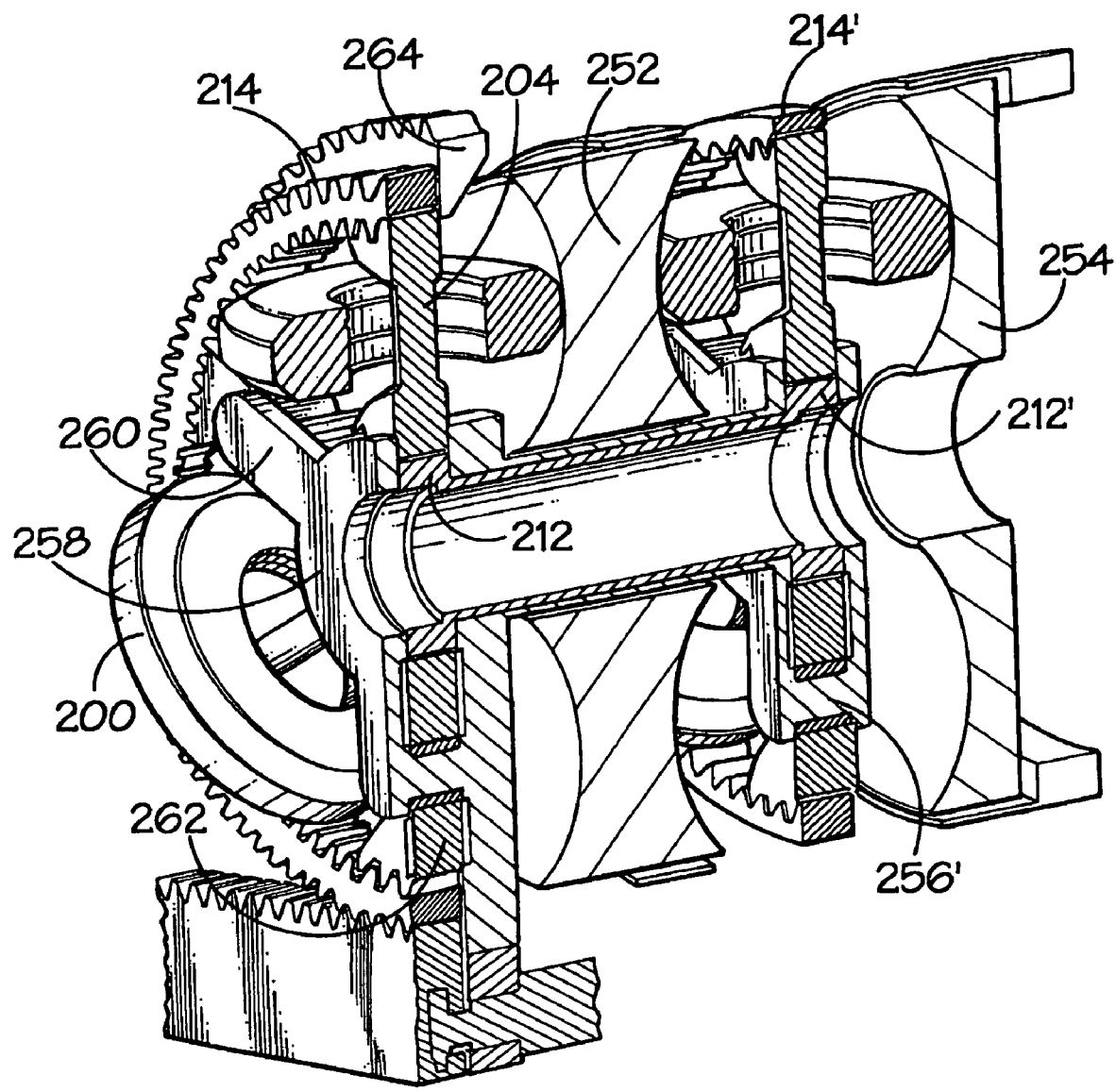
FIG. 12 illustrates selected components of a further variator embodying the present invention and is a perspective drawing but shows a section through the variator in an axial plane, a variator race which would be in the foreground of the drawing being omitted to reveal certain interior components.
Figure 13:
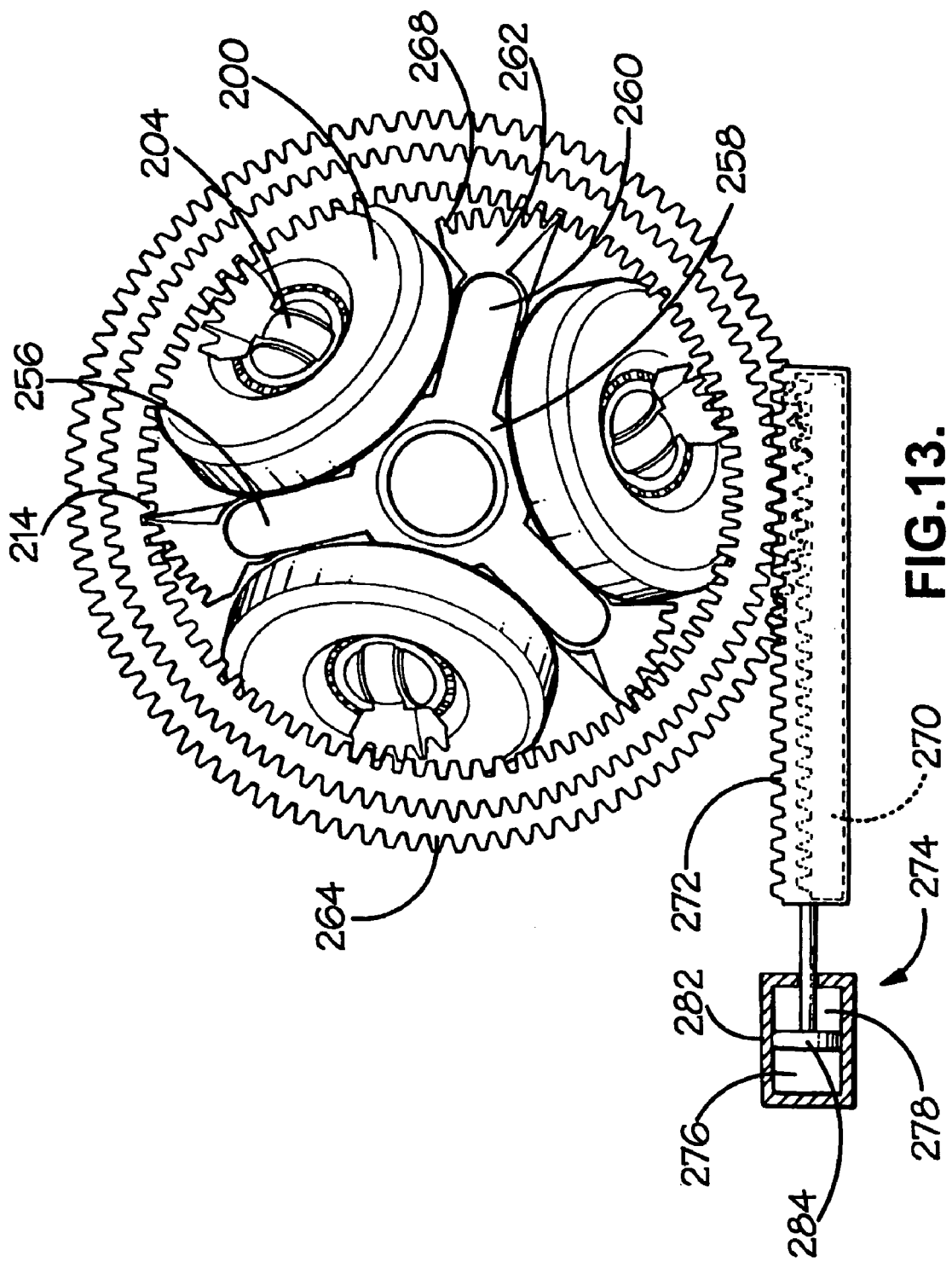
FIG. 13 is a view of the same variator seen in FIG. 12 along an axial direction, the foremost variator race again being omitted to reveal interior components.

A second means of driving the sun gear involves incorporating the sun and ring gears into an epicycloidal arrangement. The variator illustrated in FIGS. 12 and 13 provides an example and will now be described in detail. These drawings show a variator similar to that of FIG. 6 in that it has two toroidal cavities. In FIG. 12 the inner race is designated 252 and to the right hand side of the drawing is seen one of the outer races 254. The arrangement includes a further outer race which would be to the left hand side of the drawing but is omitted so that other components can be seen. The carriers and rollers are again designated 204 and 200 respectively. For the sake of representational simplicity the bearing arrangements coupling the carriers to the rollers are omitted from FIG. 12, but can be seen in FIG. 13. Each variator cavity contains three rollers 200 and each has an associated ring gear 214, 214' and sun gear 212, 212'. The arrangement further comprises in each cavity a planet carrier 256, 256' which is mounted for rotation about the variator axis and comprises a hub 258 and radial limbs 260 which serve both to carry planet gears 262 and to couple the planet carrier to an integral outer wheel 264. The planet gears 262 each engage with the sun gear 212 and ring gear 214, forming an epicyclic-type gear arrangement. Consequently by controlling rotation of the planet carrier 256 and of the ring gear 214, rotation of the sun gear 212 is also controlled. The principles involved in an epicyclic gear arrangement of this type will be wholly familiar to the skilled person. The arrangement is convenient because the planet gears 262 can be placed between the carriers 204 and move along with them, so that fouling of one by the other is avoided. Like the carriers 204 the planet gears 262 do not have a complete circular periphery but instead have inner and outer part-circular toothed parts 266, 288. Again, this assists in avoiding fouling of components within the variator cavities.

Some means is required for driving the sun and ring gears 212, 214. In FIG. 13 this is achieved by means of toothed racks 270, 272 meshing respectively with a toothed outer periphery of the ring gear 214 and with a toothed outer periphery of the wheel portion 264 of the planet carrier. The sun gear itself is of course driven indirectly, through the planet gears 262. The two racks 270, 272 may be joined to one another so that they move together. If movement of the racks is to change the carrier tilt angle and so result in change of variator drive ratio then the racks must drive the ring gear 214 and the planet carrier 256 at different rates. This is achieved in the FIG. 13 embodiment by virtue of the fact that the outer periphery of the ring gear 214 has a different diameter from the outer wheel 264 of the planet carrier. Hence as the racks 270, 272 move back and forth they cause the ring gear and planet carrier to move at different rates. Correspondingly the ring gear and the sun gear rotate at different rates, giving rise to change of carrier tilt angle and hence change of variator ratio.

This type of arrangement enables the variator to be torque controlled. The sun and ring gears together exert a biasing force urging each roller 200 along the circular path 224. This force is opposed by the forces exerted upon the roller by the races 252, 254. Motion of the rollers 200 along the path 224 results in change of the tilt angle o and hence of the variator ratio. The result is that, as in the known arrangement described above with reference to FIGS. 1 and 2, the variator creates a reaction torque which is determined by the biasing force applied to each roller. Some means is required for applying a controlled force to the toothed racks 270, 272 and in FIG. 13 a hydraulic piston and cylinder arrangement coupled to the two racks 270, 272 to serve this purpose is schematically indicated at 274. It is of double-acting type, having two working chambers 276, 278 formed within a cylinder 282 on either side of a piston 284. Thus the variator's behaviour is controlled through fluid pressure applied to the two working chambers 276, 278.

There are of course numerous alternative ways in which the necessary torques can be applied to the sun and ring gears. FIG. 14 illustrates in schematic form an alternative arrangement for driving the gearing, in which a pivotally mounted cylinder 286 contains a piston 288 coupled through a piston rod 290 to a lug 292 which is connected to the sun or ring gear 212, 214 or to the planet carrier 256. In this arrangement the piston 288 drives one of these parts of the gearing directly and some other means is needed to drive another part of the gearing.

FIG. 15 shows an arrangement in which a chain 292 is passed around one of the gearing components to drive it, the torque exerted by the chain being determined by a difference between hydraulic pressures in working chambers 294, 296 of hydraulic actuators 298,300 pulling the chain in opposite directions.

In FIG. 16 an arrangement comprising wire and pulleys is used to exert a chosen torque upon one of the gearing components. This type of arrangement is considered potentially advantageous in achieving compact variator construction since the actuators (which are omitted from this drawing, but should be understood to pull on the lines as shown by arrows 300, 302) need not be aligned transversely to the variator axis. The wire 303 is led around a gearing component (which may again be any of the sun gear 212, ring gear 214 or planet carrier 256) and around pulleys 304, 306, by virtue of which the direction along which the actuators pull the line can be chosen by the designer e.g. to meet packaging requirements.

Figure 17:
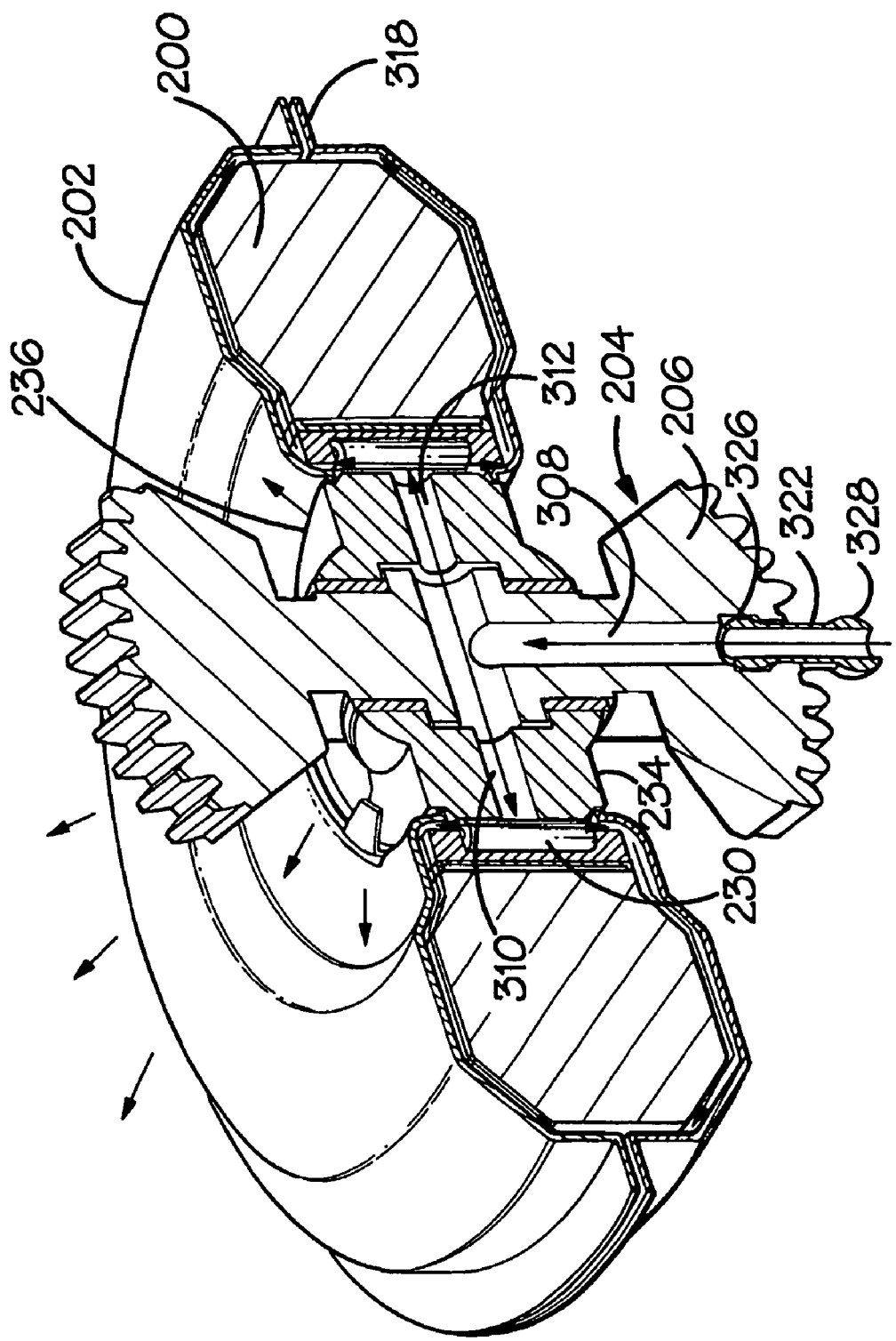
FIG. 17 illustrates a roller/carrier/shroud assembly for use in variators embodying the present invention and is a perspective drawing but shows a section through the assembly in a plane containing the roller axis.
Figure 18:
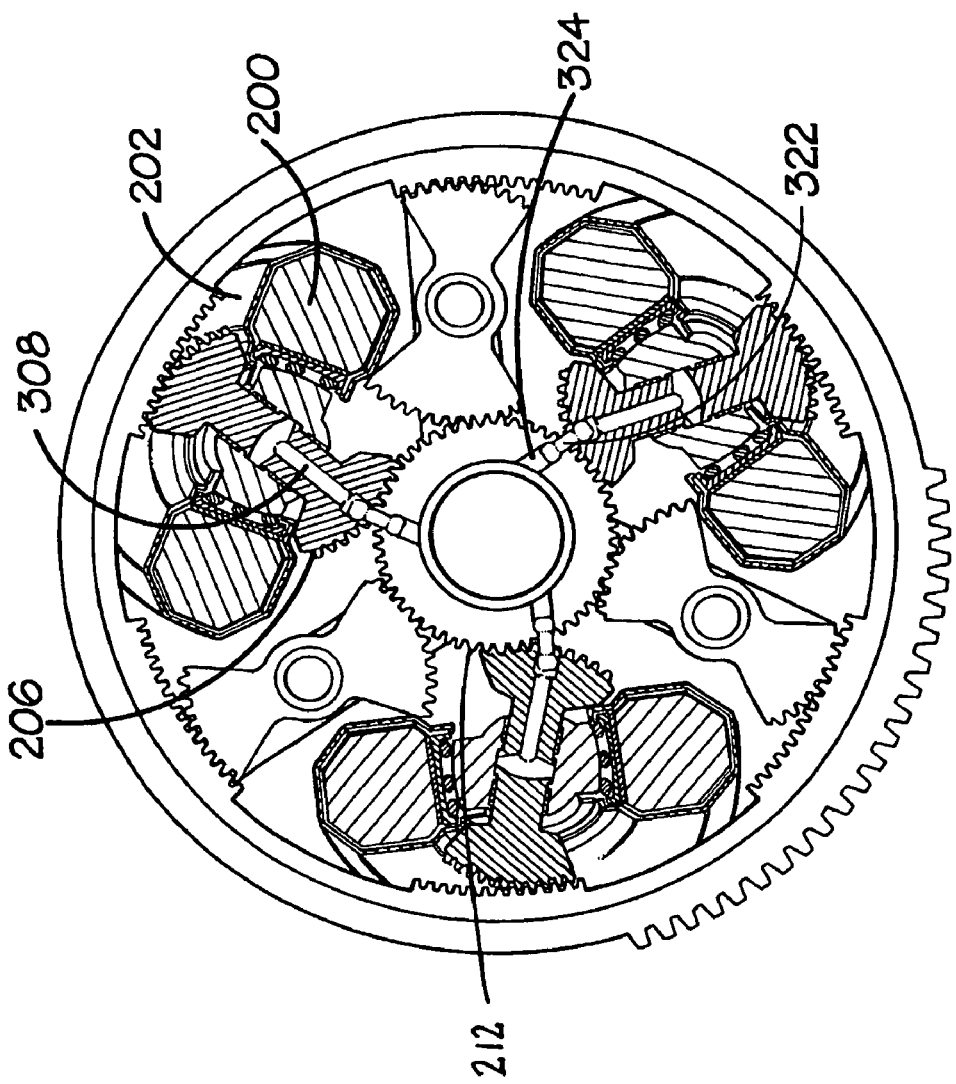
FIG. 18 is a section in a radial plane through a variator embodying the present invention and incorporating the assembly illustrated in FIG. 18.

It has been mentioned above that the rollers 200 and races 252, 254 do not normally make physical contact with each other, being separated by a thin film of fluid. Traction between the rollers and races arises from shear within this fluid film. To maintain the film, a flow of traction fluid is supplied to the rolling parts. Known arrangements for supply of traction fluid are described for example in Torotrak's published international patent application WO03/062675 and European patent EP0930449, and rely upon supply of the fluid through the carriers on which the rollers are mounted. Supplying traction fluid through the carrier is less straightforward in the types of variator illustrated in FIG. 6 onward, due to the nature of the carrier's motion, but FIGS. 17 and 18 illustrate one way in which it can be achieved. As FIG. 18 most clearly shows, a "T"-shaped fluid-supply passage 308 is formed within the carrier 204, leading from an open end in the carrier's inner toothed portion 206 to respective passages 310, 312 within respective halves 234, 236 of the inner bearing race. These passages lead to the interior of the needle bearing 230, and from here fluid passes into a chamber defined between the roller 200 and the shroud 202 surrounding it. The shroud 202 comprises two similarly formed halves which are assembled around the roller 200 and joined to each other through outer flanges 318. The shroud is mounted upon the inner bearing race parts 234, 236 and so moves with the roller 200. It is cut away as seen at 320 in FIGS. 6, 10 and 11 to enable the roller 200 to engage with the variator races 252, 254. As well as its function in providing traction between the rollers and the variator races, the fluid serves to cool the rollers. The illustrated arrangement provides, due to the supply of fluid at a radially inner part of the roller and to the provision of the shroud, a long period of residence of the fluid in the vicinity of the roller which promotes effective cooling.

A jump tube 322 is received in both the open end of the fluid-supply passage 308 and in a radial bore 324 of the sun gear 212, forming a conduit for flow of fluid from the latter to the former. The angle between the passage 308 and bore 324 changes as the carrier tilts, and to accommodate this the jump tube 332 has part-spherical heads 326, 328 which can each rotate somewhat while maintaining a seal. Fluid is supplied along an axial passage to reach the radial bores 324.

Figure 19:
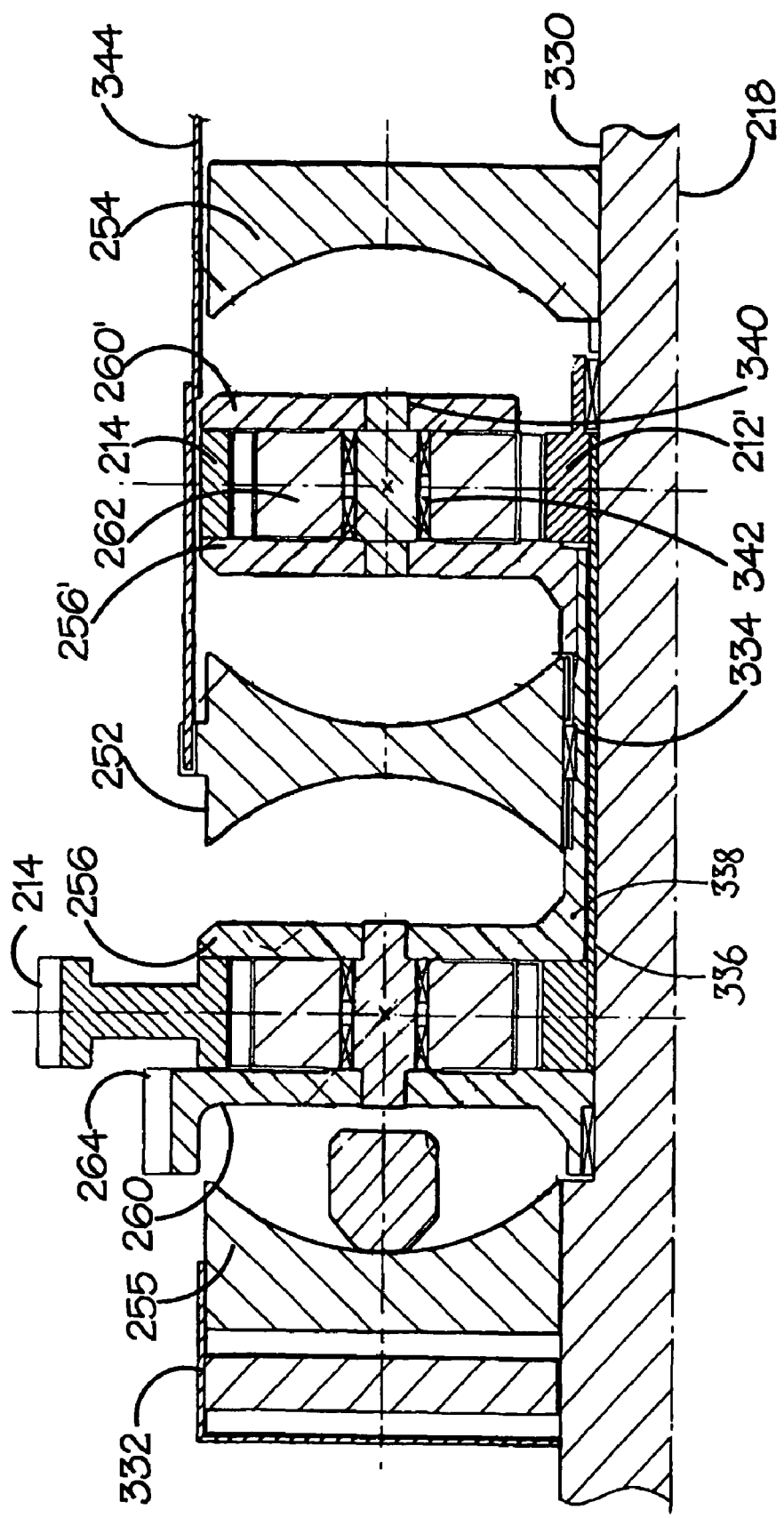
FIG. 19 is a section in an axial plane through yet a further variator embodying the present invention.

FIG. 19 is an axial section through a variator embodying the present invention and shows how parts in the two variator cavities can be coupled together. Only half of the variator, to one side of the variator axis 218, is shown. A variator shaft 330 is coupled, through gearing which is not shown, to the engine of a motor vehicle. The variator's races are seen at 252, 254 and 255. Left-most outer race 255 is mounted upon the variator shaft 330 through splines which allow it to move along the shaft but not to rotate about it. It is subject to an "end load" by a hydraulic actuator formed by a cylinder 332 which is itself mounted on variator shaft 330 and receives the outer race 255 in the manner of a piston. The right-most outer race 254 is fixedly mounted on the shaft and the inner race 252 has some limited freedom to move axially by virtue of a bearing 334 through which it is mounted. Consequently the effect of the end load is to urge all three races into engagement with the rollers 200, providing roller/race traction. In this drawing the rollers 200 are shown in three different positions corresponding respectively to 1:1 ratio and to the highest and lowest available ratios, the latter two positions being indicated in dotted lines.

In this drawing the sun gears 212, 212' in the variator's two toroidal cavities are seen to be coupled through a first sleeve 336 which lies around and is concentric with the variator shaft 330, causing the two sun gears to move in unison. The two planet carriers 256, 256' are coupled through a second sleeve 338 and in this embodiment the radial limbs 260, 260' of the planet carrier are in pairs, with a planet shaft 340 mounted between each pair to mount a respective planet gear 262 through bearings 342. The toothed outer wheel portion of the planet carrier is indicated at 264 as in previous drawings. The ring gears 214, 214' are in this embodiment located between the limbs 260, 260' of the respective planet carriers. The arrangement permits drive to be applied to the epicyclic components of only one variator cavity and transmitted through the sleeves to components in the other cavity.

It is necessary to provide for rotary drive to be applied to and/or taken from the inner variator race 252 and for many applications it is desirable to do this through some member which rotates about the variator axis (rather than by means of a chain or gearing leading to a shaft offset from the variator axis). Such co-axial coupling to the inner race can be relatively complex to achieve with existing variator designs, in which the mechanism controlling the rollers extends radially outside the variator cavities. In the present embodiment, however, co-axial power coupling is straightforwardly achieved by means of a rotor 344 connected to the inner variator race 252 and extending axially beyond the right-most outer race 254, the outboard portion of the rotor being coupled to some further gear arrangement (not shown). This simple form of co-axial coupling is possible because the gearing in the right-hand variator cavity is largely contained within that cavity, having no large radial projections to foul the rotor.

What is claimed:

1. A continuously variable ratio device comprising:
   first and second races mounted for rotation about a variator axis, the variator axis being a common axis for both the first and second races;
   at least one roller coupled to a carrier for rotation about a roller axis defined relative to the carrier, and which runs upon both races to transmit drive between them at a variable drive ratio; and
   concentrically arranged sun and ring gears, wherein the carrier includes gear teeth through which it engages with the sun and ring gears, and the coupling between the roller and its carrier permitting the roller to precess about a precession axis defined with respect to the carrier and which is non-parallel to the precession axis, so that relative rotation of the sun and ring gears causes the carrier to turn about a carrier axis which is non-parallel with the roller and the precession axes, causing precession of the roller and a consequent change in the drive ratio.

2. The continuously variable ratio transmission device as claimed in claim 1, wherein the carrier axis passes through the centre of the roller.

3. The continuously variable ratio transmission device as claimed in claim 1, wherein the carrier axis is parallel to the variator axis.

4. The continuously variable ratio transmission device as claimed in claim 1, wherein the precession axis is always inclined, by a non-zero castor angle, to a plane perpendicular to the variator axis.

5. The continuously variable ratio transmission device as claimed in claim 1, wherein the precession axis passes through the centre of the roller.

6. The continuously variable ratio device as claimed in claim 1, wherein the carrier is able to move back and forth along a path about the variator axis.

7. The continuously variable ratio device as claimed in claim 6, further comprising means for applying an adjustable force to the carrier to bias it along its path.

8. The continuously variable ratio device as claimed in claim 6, further comprising means for rotationally driving the carrier such that inclination of the carrier to a line which is radial to the variator axis and passes through the roller centre varies as a function of the carrier's position along its path about the variator axis.

9. The continuously variable ratio device as claimed in claim 1, further comprising gearing for rotationally driving the carrier.

10. The continuously variable ratio device as claimed in claim 1, wherein the carrier comprises a gear wheel having a part-circular periphery comprising inner and outer toothed portions lying on a common circular locus for engagement with the sun and ring respectively.

11. The continuously variable ratio device as claimed in claim 1, wherein both the sun and the ring are rotatable about the variator axis.

12. The continuously variable ratio device as claimed in claim 11, wherein the sun and ring are operatively coupled such that the position of one is a function of the position of the other.

13. The continuously variable ratio device as claimed in claim 11, further comprising a planet carrier mounted for rotation about the variator axis and carrying at least one planet which engages with the sun and ring.

14. The continuously variable ratio device as claimed in claim 13, wherein the sun is driven through the ring and the planet carrier.

15. The continuously variable ratio device as claimed in claim 1, further comprising a linearly movable toothed rack engaging with at least one of the sun and the ring.

16. The continuously variable ratio device as claimed in claim 15, wherein both of the sun and the ring are arranged to be driven from one or more linearly movable toothed racks.

17. The continuously variable ratio device as claimed in claim 1, further comprising a linear actuator for exerting an adjustable force and means for translating that force to a torque applied to at least one of the sun and ring gears.

18. The continuously variable ratio device as claimed in claim 17, wherein the linear actuator is hydraulic.

* * * * *